United States Patent [19]

Kirschner

[11] 4,155,095

[45] May 15, 1979

[54] CHROMA CONTROL FOR TELEVISION CONTROL APPARATUS

[75] Inventor: Wallace Kirschner, Trumbull, Conn.

[73] Assignee: Alpex Computer Corporation, Danbury, Conn.

[21] Appl. No.: 723,706

[22] Filed: Sep. 16, 1976

[51] Int. Cl.² .................. H04N 1/46; H04N 5/22; G08B 11/00; G06F 3/14
[52] U.S. Cl. ........................... 358/82; 358/22; 340/703; 340/799; 340/725; 273/DIG. 28; 273/85 G
[58] Field of Search ............... 358/81, 82, 12, 13, 358/22; 340/324 AD, 337; 273/85 R, 85 G, DIG. 28; 364/200 MS File, 900 MS File

[56] References Cited

U.S. PATENT DOCUMENTS

| | | | |
|---|---|---|---|
| 3,293,614 | 12/1966 | Fenimore et al. | 340/324 AD |
| 3,631,457 | 12/1971 | Hamada et al. | 340/324 A |
| 3,720,780 | 3/1973 | Remey et al. | 358/13 |
| 3,771,155 | 11/1973 | Hayashi et al. | 340/324 AD |
| 3,812,488 | 5/1974 | Yoshino et al. | 340/324 AD |
| 3,886,588 | 5/1975 | Dalke | 358/82 |
| 3,895,357 | 7/1975 | Schwartz et al. | 364/200 |
| 3,898,377 | 8/1975 | Fairbairn et al. | 358/160 |
| 3,944,999 | 3/1976 | Moore | 358/13 X |
| 3,988,728 | 10/1976 | Inoue et al. | 340/324 AD |
| 4,026,555 | 5/1977 | Kirschner et al. | 340/337 X |

OTHER PUBLICATIONS

"Computer Dictionary & Handbook"; Sippi & Sippi—1972, p. 121.

Primary Examiner—John C. Martin
Assistant Examiner—Aristotelis M. Psitos
Attorney, Agent, or Firm—Darby & Darby

[57] ABSTRACT

Apparatus and method for including color control with an apparatus producing "black-and-white" signals for a television receiver. Logic circuits, which activate circuits for the generation of the color-carrying video signals, are responsive to coded or uncoded control information included in a chroma control word which comprises a predetermined number of data bits. This control information includes information for color selection and may provide for sequencing of colors across each horizontal line of display of the receiver. This control information may be updated by a micro-processor which controls image movement on the television screen.

7 Claims, 8 Drawing Figures

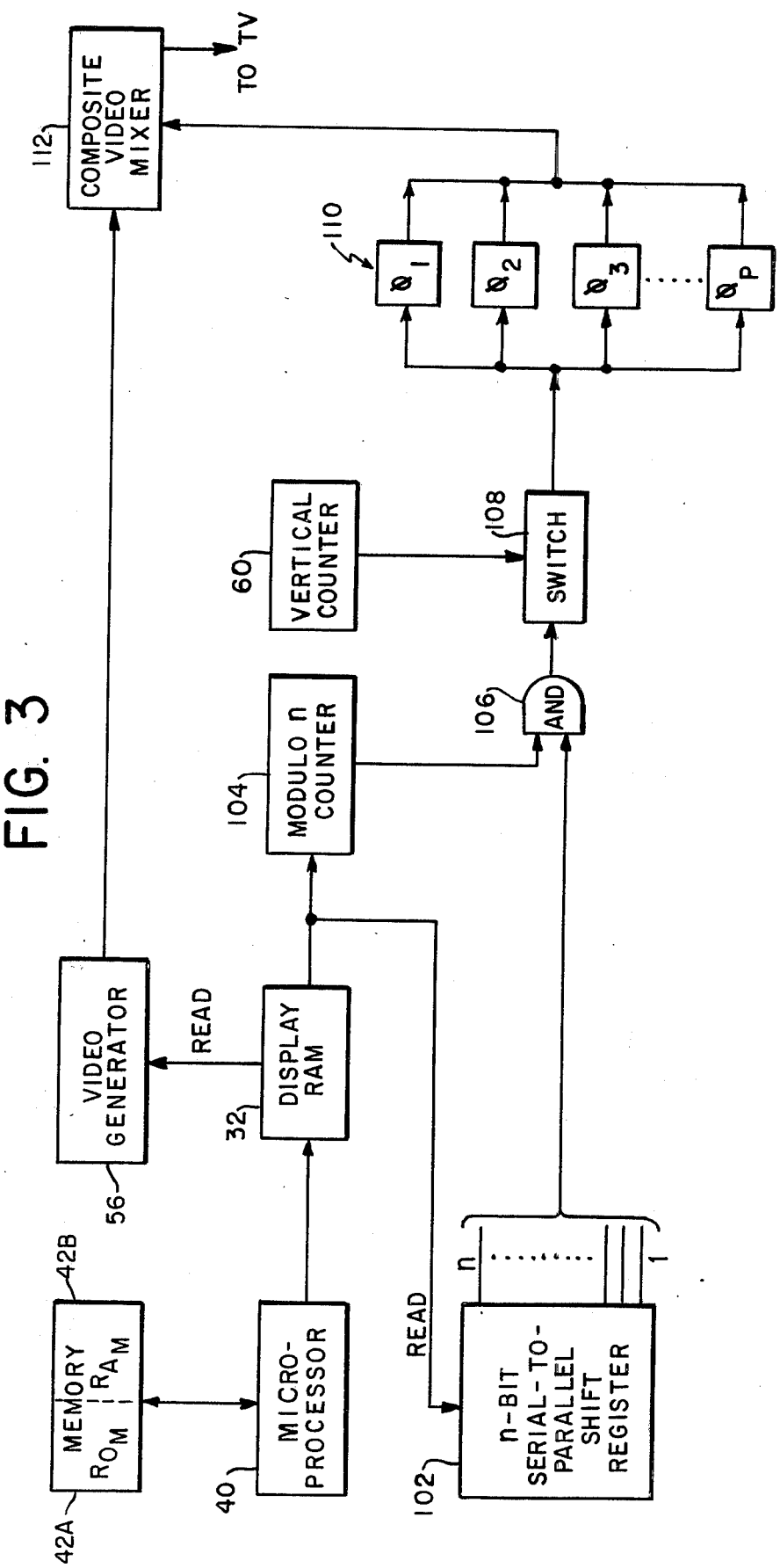

FIG. 6
| BIT POSITION | 1 | 2 | 3 | . | . | . | . | . | . | n | COLOR SEQUENCE 1 |
|---|---|---|---|---|---|---|---|---|---|---|---|
| | 1 | 0 | 0 | . | . | . | . | . | . | 0 | COLOR SEQUENCE 2 |
| | 0 | 1 | 0 | . | . | . | . | . | . | 0 | "        "        3 |
| | 0 | 0 | 1 | . | . | . | . | . | . | 0 | "        "        . |
| | . | . | . | . | . | . | . | . | . | . | . |
| | . | . | . | . | . | . | . | . | . | . | . |
| | 0 | 0 | 0 | . | . | . | . | . | . | 1 | COLOR SEQUENCE n |
←—CHROMA CONTROL WORD—→
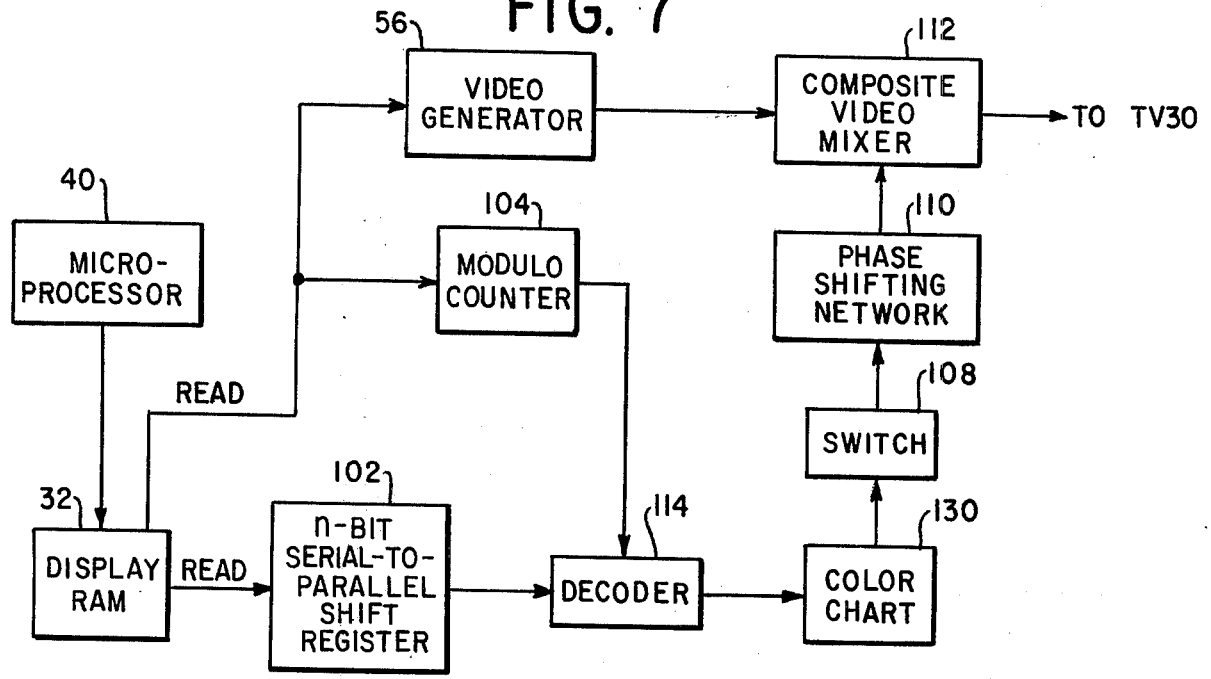
FIG. 7
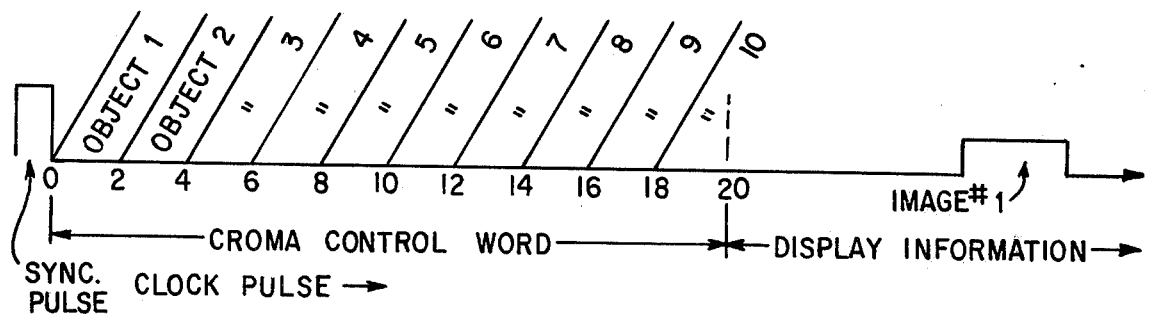
FIG. 8

CHROMA CONTROL FOR TELEVISION CONTROL APPARATUS

BACKGROUND OF THE INVENTION

This invention relates to the control of the video display of a television receiver. More particularly, the present invention concerns a device, adapted to be connected to the antenna terminals of a television receiver, which is capable of producing a color display including various image symbols, the positions of which can be selectively manipulated by a user. Such devices are of particular utility as entertainment devices, although they are not so limited.

It is desirable to enable television control devices to generate or include the necessary signals for color display in order to generate images which are more pleasing visually and which may vary in certain details as conditions vary. By the addition of color-carrying signals to other signals produced by an external control device, which may illustratively take the form of a game-playing apparatus, a standard color television receiver may present a playing field, the players, the playing piece, the score, and the background on the screen all in different colors. The colors may vary with time also. For example, as a player approaches triumph, the background color of the image may change from one color to another.

Accordingly, it is an object of the present invention to provide a method and apparatus by which a television control apparatus may provide for the generation of color-carrying signals.

A further object of the present invention is to provide an apparatus and method providing for color control which is responsive to changes in display image sequence and conditions.

Another object is to provide a method and apparatus for control and color information which is compatible with any standard television receiver where the sequence of images to be displayed which have differing colors is known or may be calculated prior to their display on the receiver.

SUMMARY OF THE INVENTION

These and other objects are obtained by providing a chroma control word which contains an instruction for circuits to generate color-carrying video signals at appropriate times. The chroma control word comprises a predetermined number of data bits, and may be generated or read from a memory bank. Each bit has a selected value, and the control word thus may contain any of a wide variety of predetermined instuctions.

In an elementary form the color instruction need not relate to the images displayed on the television screen. More versatility is gained, however, when detection circuits are included to distinguish the information signals of one display image from those of another, and the chroma control word is applied to logic circuits cooperating with these detection circuits. Then, the chroma control word may be used to cause certain of the images to be displayed in one or more colors.

The chroma control word which is provided is under system control. It may be constant, and thereby instruct generation of the same color or colors at certain times, or it may be responsive to positional ordering, and changes of positional ordering, of images being displayed on the receiver. In the latter case, the system would select or generate a new chroma control word or update a stored "old" chroma control word to meet the new display conditions.

BRIEF DESCRIPTION OF THE DRAWINGS

In the description of the preferred embodiment reference is made to appended drawings in which:

FIG. 2 is a diagram of chroma control word information for a simple system having fixed objects and fixed color for each object on each line;

FIG. 3 is a block diagram showing use of a chroma control word in that system of fixed object and fixed color per line described in FIG. 2;

FIG. 6 is a diagram of chroma control word information for a system of dynamic and fixed objects and selecting a color for each of the objects displayed across each line of television scan;

FIG. 7 is a block diagram showing use of a chroma control word in the dynamic object and changing color system of FIG. 6; and FIG. 8 is a diagrammatic illustration showing chroma control word positioning for a system having only a few moving and static display objects.

DESCRIPTION OF THE PREFERRED EMBODIMENT

Figure 1:
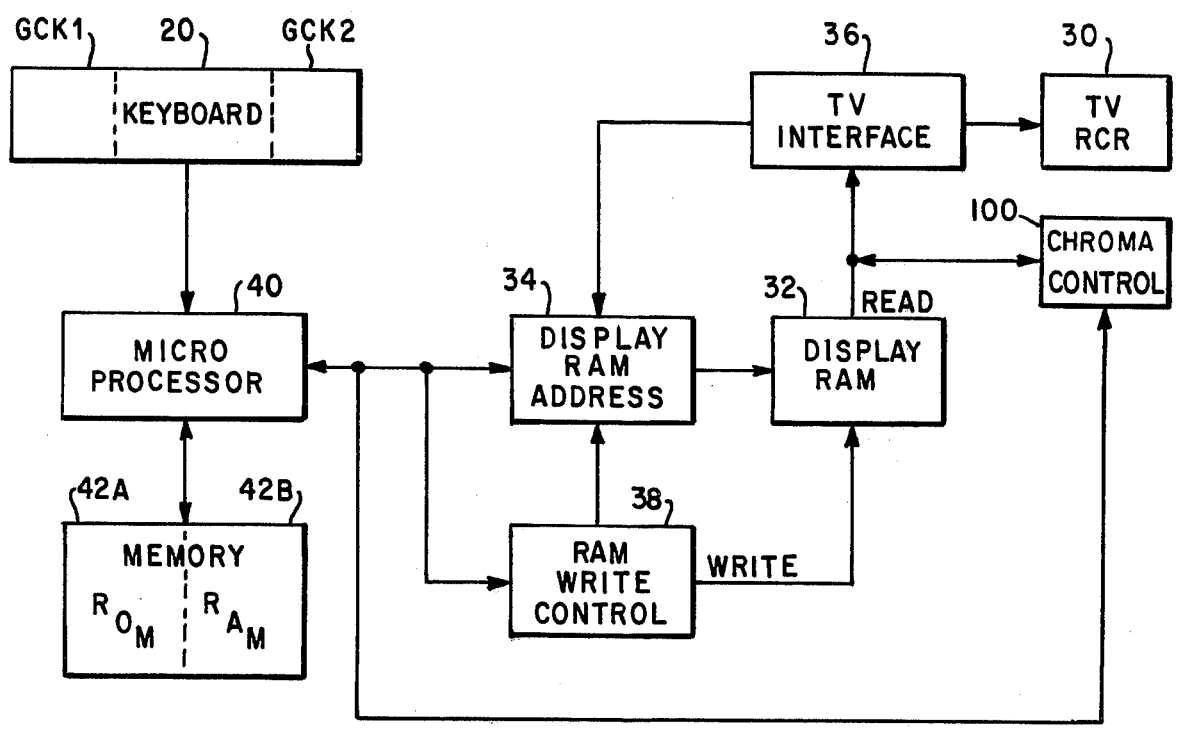
FIG. 1 is a block diagram of one type of television control apparatus with which the present invention is compatible and which shows generally where an apparatus according to the present invention may be incorporated.

The present invention may be used in conjunction with any luminance control apparatus for a television receiver, such as the one illustratively shown in FIG. 1. A chroma control word for each horizontal line of scan is provided and contains a plurality of information bits. This chroma control word controls both the color and color sequencing when applied to display electronics. The chroma control word may be under program control, and thus may provide for dynamic control depending on actual display conditions.

The present invention will be described with reference to the television game apparatus described above and illustrated in FIG. 1. However, this invention may be used in any system to incorporate color information signals with black-and-white signals.

The external control device shown in FIG. 1 is described in United States patent application Ser. No. 557,484 of Wallace Kirschner and Lawrence Martin Haskel, filed Mar. 12, 1975 and entitled "Television Display Control Apparatus" and now U.S. Pat. No. 4,026,555. The device there set forth produces luminance information for television intensity control.

Devices which are used to display information on standard television receivers must produce standard horizontal retrace and blanking pulses and vertical sync retracing blanking pulses with the video information interspersed in the same manner as though the signal has been generated by a remote television transmitter. In the United States, a television raster comprises 525 horizontal lines repeated at 30 Hz (actually, 262.5 lines interlaced odd/even and repeated at a 60 Hz rate). Each horizontal line takes 63.5 microseconds to scan from left to right and retrace to start the next line. At the conclusion of each horizontal line, a horizontal retrace and blanking pulse is applied to the receiver to synchronize the set for the next line, and the sequence is repeated. At the end of 262.5 lines, the beam is at the bottom of the raster, and a vertical retrace and blanking pulse is transmitted to return the beam to the top of the raster. The active display area as the beam travels horizontally from left to right exists for approximately 53 microseconds. The system described in Ser. No. 557,484 "digitizes" the television raster by subdividing each of the horizontal scanning periods into a number of discrete periods. That is, each horizontal line is subdivided into a number of discrete bars. Each of the horizontal bars is subject to program control to modulate a generated RF carrier instructing the receiver whether to illuminate or not to illuminate.

Thus, one system with which the present invention is compatible is shown in FIG. 1 and includes a random access memory 32 capable of storing at least as many information or data bits as the number of horizontal bars in one frame of the television receiver picture. In each of the memory positions of the random access memory (hereinafter referred to as a RAM) 32 a binary "1" or "0" is stored with those bits correlating exactly to the desired image to be displayed on the television screen. Consequently, RAM 32 may be regarded as a digital representation of the actual image to be displayed.

The information stored in the display RAM 32 can be read from or written into the RAM, one bit at a time. Thus, the display device includes a RAM address circuit 34 which may selectively address each storage position individually in RAM 32 to permit data to be read from RAM 32 for display purposes or to be written into RAM 32 to change the existing display.

A television interface circuit 36 causes the RAM address circuit 34 to scan sequentially each of the storage positions in the RAM 32. The TV interface circuit 36 also provides the required horizontal and vertical sync pulses for the television receiver 30. Thus, the TV interface circuits 36 translate the multiplicity of data bits in RAM 32 into a composite video signal which is compatible with the television receiver 30, thus enabling the receiver 30 to display the "image" stored in the RAM 32.

A RAM write control circuit 38 enables data to be written into the RAM 32 to change the display on the television screen. The write control circuit 38 may seize control of the RAM addressing circuits 34 whenever it is desired to update the image data stored in RAM 32.

The system's "intelligence" is provided by a microprocessor 40 which operates in conjunction with a memory comprising a read-only memory (ROM) 42a and a RAM 42b. The microprocessor 40 is responsive to game controls on a control board 20, and continuously polls the board to receive instructions for modification of the display image. When an instruction is given on the control board, the micro-processor calls a program stored in ROM 42a. When a change in an existing image device position is required, micro-processor 40 uses the stored program to determine the new image device position. Microprocessor 40 also responds to positional change of image symbols where necessary in view of previous frames. That is, if the unit is used to play a hockey game, for example, an image symbol in the form of a ball or puck must be set in motion. Movement of the puck from one frame must be carried to successive frames. The microprocessor consequently responds to positional change of image symbols. By following prior movement of the "puck," it calculates its new position for each frame. By means of the RAM write controls 38 and the RAM address circuit 34, the micro-processor 40 erases the old image representation in display RAM 32 and substitutes a new image representation at the proper storage locations.

Proper scanning of the display RAM 32 requires that each bit of information be read exactly when the beam of the television tube is traversing the bar of the screen corresponding to that bit. For that purpose, scanning of the RAM 32 is controlled by a horizontal counter and a vertical counter both of which are driven by a master clock. If, for example, each horizontal line is divided into 132 time elements or bars, then the horizontal counter counts from the number 1 to the number 132 in equal increments as the beam moves across a horizontal line. The carry-over from the horizontal counter is coupled to a vertical counter which, in a similar way, produces a binary output on eight output lines representing which of the 262.5 horizontal lines is scanned. Hence, at any given time, the binary numbers appearing at the outputs of the horizontal and vertical counters represent horizontal and vertical addresses of the discrete bars then being scanned. Consequently, an "address" is intended to mean, implicitly, the location of a storage position in RAM 32 corresponding to an device or symbol position relative to the TV screen.

As mentioned above, the clock circuit for the master clock is included in TV interface circuits 36 which generates appropriate horizontal and vertical synchronizing signals. These required video signals are generated by sync generator circuits included in the interface circuits 36 cooperating with a video generator. The video generator also receives the binary information read from the display RAM 32 and consequently receives all required TV timing pulses and a binary signal representing the desired condition (blanked or unblanked) of the bar being scanned by the TV beam. The video generator sums these signals to yield a composite signal which is then modulated at the proper carrier frequency for a selected channel. Preferably this should be an unused channel in the area in which the device is employed.

In such a television control apparatus, only luminance information is provided, thereby limiting the control utility to black-and-white display only.

To include color signals with those generated by this "black-and-white" system, the invention preferably utilizes the retrace signal time of the scanning beam, where the video presentation is blanked. Any video information provided during this time will not be displayed on the television raster, but will be available for other purposes such as logical operations for color control.

As indicated above, the time for one horizontal line of scan on standard television receivers is approximately 63.5 microseconds, which includes approximately 10 microseconds for the horizontal retrace. If the display control apparatus incorporates a clock oscillator operating at approximately 2 MHz, each horizontal line, lasting 63.5 microseconds, will be divided into approximately 126 addressable locations or information bits. Consequently, two bits of information per microsecond of horizontal scan are available. Where the retrace time is approximately 10 microseconds, approximately 20 bits of information remain unused on each line of scan. These 20 bits can therefore be used for the chroma control word, and each line of scan will be associated with a chroma control word. As will become apparent, the number of bits in the chroma control word will limit the utility of a system operating with the aforementioned parameters if, for example, more than twenty objects must be displayed on the television raster across any given line of scan. Where a greater number of objects must be displayed, this system may be used if the clock frequency is increased, thereby providing a greater number of information bits available during the horizontal retrace time. A clock oscillator operating at 2 MHz is taken, therefore, in an exemplary sense.

It will be understood that presenting the chroma control word during the horizontal retrace time is convenient, but not essential. So long as the chroma control word is presented before the horizontal scanning line of the receiver, the present invention may be used. Thus, a control word for line number 99 on the screen may be presented during display of, for instance, line number 98. However, presentment during the retrace time between lines number 98 and 99 offers greater simplicity as will be explained below.

FIG. 2 illustrates the information code of a chroma control word for a system where each display line of the receiver has fixed objects and fixed colors. Such a system includes, for example, word games, number games, and other alpha-numeric displays. For a chroma control word having n bits, color information can be imparted for any of up to the first n images displayed in sequence across a line of scan. Each bit in the chroma control word includes the binary signals of "0" or "1". A chroma control word having all bits set to "0" indicates that no color information is to be generated and added to the luminance information. A binary "1" in the first bit (reading the bits from left to right) indicates the generation of a color signal for the first image to be displayed in sequence across the horizontal line of scan. A binary "1" in information bits 1 and 2 indicates the addition of color for the first two objects in sequence across the line of scan. In this way, color may be added for any of n objects in any order. The specific color added may vary from line to line as may be determined by circuits not dependent on the chroma control word. For instance, a specific phase-shifting network for color generation may be activated by horizontal lines of scan numbered 1 through 100, as determined by a vertical counter associated with the video generator of the control apparatus. Horizontal lines numbered 101 through 200 may activate a second phase-shifting network for the generation of a second color, and so forth. Thus, this type of chroma control word contains information for the generation of color signals for selected display images for each line of scan.

Referring now to FIG. 3, the micro-processor 40 controls the display RAM 32 which includes stored information bits representing the television raster. The micro-processor, as described above, may move display images (or image devices) on the raster by writing new information into the display RAM 32 according to instructions received from a control board 20 (FIG. 1) and computed according to a program stored in ROM 42a. Consequently, the micro-processor at all times has at some time provided the current information for each bit to be displayed and consequently knows in advance the image positions. It accordingly provides an appropriate chroma control word in advance of each horizontal line. In one embodiment the control words for each line are stored in display RAM 32 and updated by the micro-processor 40 whenever necessary. Alternatively, the micro-processor 40 may determine the control word needed in advance of display and generate the required word. Another alternative allows the micro-processor to select a control word from a separate read-only memory. Preferably the chroma control word is stored in RAM 32 and is read along with the display image representation. Because the electron beam is not illuminating the receiver during retrace time and the control word is stored in the bits in RAM 32 corresponding to the retrace time bars, the control word is not displayed on the receiver. Rather, the chroma control word is read into an n bit serial-to-parallel shift register 102 which is enabled only during the horizontal retrace time. It retains the chroma control word information during the display portion of the horizontal line following, and each of the n bits is presented in parallel format. As the electron beam horizontally scans the television receiver 30, the binary display information stored in the display RAM 32 is read off and applied to a video generator 56 to generate an amplitude modulated signal applied ultimately to the antenna terminals of the television receiver 30. Simultaneously, the binary display information read from the display RAM 32 is applied to a modulo n counter 104. This counter is responsive to value changes of the data. Thus, the modulo n counter 104, upon receiving its first "1" bit from the display RAM 32, counts the first image to be displayed on the line of scan. No change in the modulo n counter 104 occurs until the counter is reset by a change from a "1" value to a "0" value read from the display RAM 32. This indicates that the electron beam will have finished illuminating the first display image, and the modulo n counter 104 is thus reset and ready to count the second display image.

When the modulo n counter registers an image symbol being displayed on the television raster, it applies a signal to one input of an AND gate 106. To the second input of AND gate 106 is applied the color control information from the first bit of the control word, which has been presented in parallel format by the serial-to-parallel shift register 102. Consequently, if the display RAM is indicating an image symbol and the first bit of the chroma control word indicates the addition of color, the AND gate 106 will activate a phase-shifting network 110 to generate a color signal on a color subcarrier. A plurality p of phase-shifting networks may be used and activated on a per line basis by a switching circuit 108 cooperating with a vertical counter 60. The switching circuit 108 would be subject to control independent of the chroma control word. The output of the phase-shifting networks 110 is applied to video mixing circuit 112 which also receives the amplitude modulated video signal from the video generator 56 to form a composite video signal which is applied to the antenna terminals of television receivers.

Figures 4, 5:
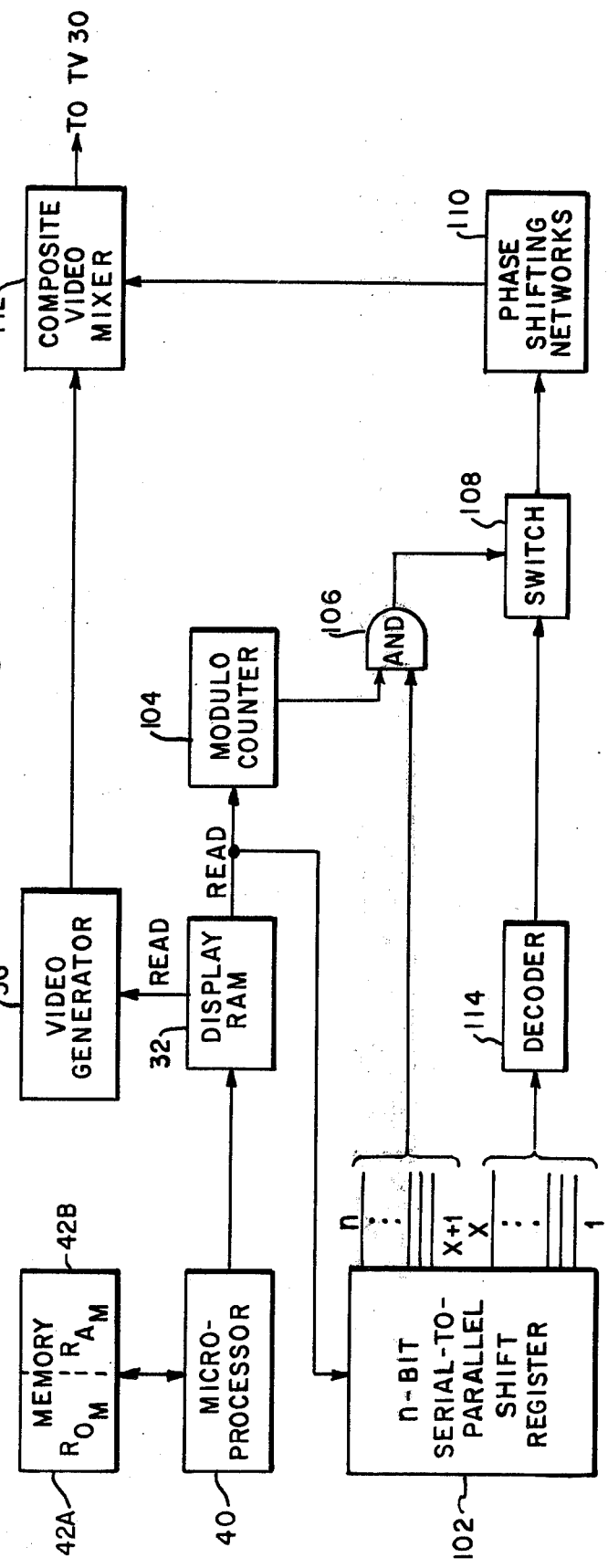
FIG. 4 is a diagram of chroma control word information for a system having fixed objects and selecting one color for all of the objects on a per line basis.
FIG. 5 is a block diagram showing use of a chroma control word for that fixed object, changing color system of FIG. 4.

Shown in FIG. 4 is chroma control word information for a fixed object, changing color system. Here, the particular phase-shifting network 110 to be selected is determined by the chroma control word for each scanning line rather than by external circuits. Once again, the chroma control word includes n information bits. Reading from left to right, the first x bits comprise the "color block" of the control word, while the remaining n minus x bits comprise the "image block". The information contained in the color block determines which color will be selected by a switching network 108 shown in FIG. 5, and the image block determines which display images in sequence on the television line of scan will be displayed in the selected color for that line. The image block operates in identical manner as the chroma control word described above with reference to FIGS. 2 and 3.

Because the number of information bits in the chroma control word is limited to n, the number of bits allowed to the image block may be maximized by encoding the color block. Illustratively, the color block information is presented here in a binary code so that for a color block having x bits of information, a total of 2x colors may be described. Other codes may be employed, if desired, to enable a greater selection range for a given number of information bits in the "color block" of the chroma control word. In binary code, if only eight colors need be shown, then 3 bits must be allocated to the "color block". Since 20 bits of information are available during the horizontal retrace time, any of 17 display images per line may be displayed in any one of those eight colors.

FIG. 5 shows a block diagram of a system utilizing the type of chroma control word shown in FIG. 4 and described above. As the micro-processor 40 updates the display RAM 32, it determines the sequence of image symbols displayed across each horizontal line and updates the chroma control word associated with the display information for each line of scan. The control word is loaded into an n bit serial-to-parallel shift register 102 which presents both the color block bits (numbers 1 through x) and the image block bits (numbers x+1 to n) in parallel format. The color block information is applied to decoder 114 to ascertain which phase-shifting network 110 will be activated at appropriate times during the ensuing 53 microseconds of active display time. The first bit of the image block, bit x+1, is applied to one input AND gate 106. A modulo counter 104 monitors the binary information read off the display RAM 32 and registers or counts a signal when the first image symbol is encountered. This signal is applied to the other input of the AND gate 106. Thus, if the first information bit in the image block indicates that a color is to be added, as determined by the color selection information in the color block, and the modulo counter indicates that an image symbol is present, the AND gate 106 activates switching circuit 108 causing the phase-shifting networks 110 to generate the proper color signals. The switching circuit 108 cooperates with the decoder 114 to select the proper network. The color video information is added to the luminance information at composite video mixing circuits 112. The modulo counter 104 communicates with the serial-to-parallel shift register 102 so that after the information for the first image symbol read from the display RAM 32 terminates, the serial-to-parallel shift register will present the second information bit in the image block. This proceeds until the horizontal synchronizing signal causes the next line of information in the display RAM 32 to read out a new chroma control word. It is to be noted, therefore, that not all of the information bits in the image block are used unless a similar number of image symbols are counted by the modulo counter 104.

FIG. 6 shows a diagram of control word information for a system shown in FIG. 7 to present different colors for each image object along each line of scan and which provides for moving image symbols. The chroma control word again includes n bits of information. These n bits form the first part of an address for a memory bank which is called the color chart 130. For the dynamic control of color, the micro-processor 40 updates the chroma control word in the display RAM 32 for each line whenever the information on that line must change due to game conditions. The display RAM 32 is read as the electron beam scans the television receiver 30 and the control word is read out at the beginning of each line of scan. The control word is loaded into an n bit serial-to-parallel shift register 102 and the luminance information, i.e., the "image", which follows the control word in the display RAM 32, is applied to a video generator 56 to generate an amplitude modulated carrier. A modulo counter 104 records intensity increases by advancing one count each time the binary values on two sequential information bits in display RAM 32 changes from a binary "0" to a binary "1". The modulo counter 104 shown in FIG. 7 in this embodiment presents the image symbol count in the form of a parallel binary signal. This signal forms part of the address for information to be read from the color chart 130. The parallel output from the serial-to-parallel shift register 102, together with the binary parallel address of the modulo counter 104 is applied to decoder 114. The decoder then addresses the color chart 130 with the address formed by the n bits of the chroma control word and the bits added by the modulo counter. As the display RAM 32 is read, the address changes due to the increasing count of the modulo counter 104. Consequently, by placing the selection of the n bits in the chroma control word under program control, a particular sequence may be counted through by the simple process of including the binary parallel output of the modulo counter. Therefore, the color chart 130 includes predetermined sequences of color information, any of which may be called upon by the read circuits of the decoder 114.

The output of the color chart is applied to a switching circuit 108 which determines which phase-shifting network 110 will generate a color subcarrier. The subcarrier is mixed with the amplitude-modulated carrier at video mixing circuits 112. The amplitude-modulated color-carrying video signal is applied then to the television terminals.

For example, assume that four bits of information are available for the chroma control word. Assume further that no more than 16 images will be displayed across a given line of scan of the television receiver 30. Finally, assume that four colors are to be utilized for any of these 16 objects.

Because the chroma control word will be binary coded, the four bits of information provide 16 possible addresses. If 16 images may be counted across a given line, the modulo counter must have four outputs to provide a binary address. These four bits are added to the four bits of the chroma control word, to form an 8 bit address. Each address represents a byte which includes information for the color to be generated. Also, at least two bits of information at each of these bytes must be provided to represent any of the four colors available. Assuming, then, that the color code were binary-encoded, the number of locations in the memory must at least include $2^4$ bits determined by the chroma control word, $2^4$ bits determined by the modulo counter for each of the chroma control word addresses, and two bits of information for each byte selected. Thus, 512 information bits must be required in the color chart 130.

Where up to 20 information bits are available during the horizontal retrace time, it is possible to use the chroma control word to define changing color across each line without requiring a color chart 130 assuming, of course, that no more than four colors are desired. This is achieved by pairing two information bits with each display object as shown in FIG. 8. Thus, ten objects may be controlled. If the information in each of the two bits is binary-encoded, then four possible colors may be chosen. The chroma control word again would be stored illustratively in a display RAM 32. The control word would be updated by the micro-processor 40 as game conditions vary.

If fewer than 10 images are to be displayed across each line, then a greater number of bits can be allocated to each such image, resulting in a greater selection of colors for each image symbol. Alternatively, the number of bits may be increased by increasing the clock frequency.

Each of the system mentioned above provides for the addition of color to the image symbols displayed across a line of scan on a color television receiver 30. The addition of color between the image symbols is easily provided by including a circuit to register changes from a binary "1" to a binary "0" as the display RAM 32 is read. This would occur whenever an image symbol to be displayed on the television screen 30 terminates. The circuit may easily be incorporated in the modulo counter 104 and would register the "end" of an image symbol. It then activates a phase-shifting network 110 for the generation of a color signal until the modulo counter registers the beginning of a new image symbol to be displayed.

In sum, the color control word system provides a convenient tool for generating color-carrying signals in a television control apparatus. In one aspect, the control word is applied to display image registering or counting circuits which are responsive to the sequence of the binary values in the control word. It is convenient, but not essential, to apply the appropriate control word during horizontal retrace time, but it may be applied any time prior to the actual scan of the line with which the word is associated. The control word may determine which of a plurality of color signals will be generated, as well as determining which of the display images will call for the generation of a phase-shifted color carrier to be mixed with the luminance video signal.

By placing the control word under program control, these selections and terminations may be responsive to changing conditions of the display, for example, a change of color sequence due to vertical movement of a display image.

To those skilled in the art it is apparent that this invention can take various useful forms, and it is intended that this disclosure be taken in an exemplary sense, and that the scope of protection be afforded by the appended claims.

What is claimed is:

1. Display control apparatus for use with a color television receiver including video signal input terminals, a display tube, and means for scanning said display tube at a predetermined rate in a multiplicity of horizontal lines, comprising memory means having a multiplicity of discrete digital storage positions, each of said storage positions corresponding to a preselected image area of said display tube, data processor means including storage means for storing therein digital data representing a plurality of image symbols and a plurality of chroma control words, each of said chroma control words containing a digital data representing the chrominance of all of the image areas of at least one horizontal line to be displayed in color, means under control of said data processor means for selectively transferring data representing at least one of said image symbols to said memory means, means for sequentially reading stored data from said storage positions at said predetermined scanning rate, with each storage position being read essentially as the predetermined image area of the display tube corresponding to that storage position is being scanned, means responsive to a selected chroma control word and said means for sequentially reading for generating chrominance signals for each portion of an entire horizontal line to be displayed in color, and means for combining said chrominance signals with the output of said means for sequentially reading to produce a color video signal adapted to be coupled to the video signal input terminals of a television receiver.

2. Display control apparatus according to claim 1, wherein selected ones of said chroma control words are transferred to said memory means with said image symbol data, said chroma control words being read from said memory means during horizontal retracing.

3. Display control apparatus according to claim 2, wherein
said generating means is responsive to each of said chroma control words stored in said memory means and the digital data representing an image device in the horizontal line associated with that chroma control word.

4. Display control apparatus for use with a color television receiver including video signal input terminals, a display tube, and means for scanning said display tube at a predetermined rate in a multiplicity of horizontal lines, comprising
means for generating a digital chroma control word for each horizontal line, each said chroma control word representing the chrominance of each part of its corresponding line intended to be displayed in color,
color generating means for producing chrominance signals for each horizontal line of scan, said chrominance signals determining the color(s) in which each part of a line is to be displayed,
decoder means responsive to said chroma control words for enabling said generating means, and
means for combining said chrominance signals with a luminance signal to produce a composite video signal adapted to be coupled to said video signal input terminals.

5. Display control apparatus according to claim 4, wherein said decoder means causes said color generating means to produce a preselected chrominance signal for selected images appearing in a horizontal line depending on the value of said chroma control word.

6. Display control apparatus according to claim 5 wherein said decoder means causes said color generating means to produce any one of a plurality of preselected chrominance signals for one or more of the images appearing in a horizontal line depending on the value of said chroma control word.

7. Display control apparatus according to claim 6, wherein said color generating means includes means for storing a color chart representing selected colors for particular image sequences in a horizontal line, with the colors and sequences being selected by said decoder means.

* * * * *

UNITED STATES PATENT AND TRADEMARK OFFICE
CERTIFICATE OF CORRECTION

PATENT NO. : 4,155,095
DATED : May 15, 1979
INVENTOR(S) : Wallace Kirschner

It is certified that error appears in the above-identified patent and that said Letters Patent are hereby corrected as shown below:

In claim 7, line 1, change "6" to --5--.

Signed and Sealed this

Twenty-sixth Day of February 1980

[SEAL]

Attest:

SIDNEY A. DIAMOND

Attesting Officer　　Commissioner of Patents and Trademarks